US012654531B1

(12) United States Patent
Lieberum et al.

(10) Patent No.: US 12,654,531 B1
(45) Date of Patent: Jun. 16, 2026

(54) ELECTRICAL DRIVE AXLE AND VEHICLE COMPRISING AN ELECTRIC DRIVE AXLE

(71) Applicant: VOLVO TRUCK CORPORATION, Gothenburg (SE)

(72) Inventors: Nicholas Lieberum, York Springs, PA (US); Richard S. Brandt, Fayetteville, PA (US); Frank Bryan, Chambersburg, PA (US); Sean Skinner, Martinsburg, WV (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/209,169

(22) Filed: May 15, 2025

(51) Int. Cl.
| | |
|---|---|
| *B60K 1/02* | (2006.01) |
| *B60K 1/00* | (2006.01) |
| *B60K 17/02* | (2006.01) |
| *B60K 17/08* | (2006.01) |
| *B60K 17/16* | (2006.01) |
| *F16H 37/08* | (2006.01) |
| *B60K 17/04* | (2006.01) |

(52) U.S. Cl.
CPC .................. *B60K 1/02* (2013.01); *B60K 1/00* (2013.01); *B60K 17/02* (2013.01); *B60K 17/08* (2013.01); *B60K 17/165* (2013.01); *F16H 37/0806* (2013.01); *F16H 37/0813* (2013.01); *B60K 2001/001* (2013.01); *B60K 17/046* (2013.01); *F16H 37/082* (2013.01); *F16H 2200/0021* (2013.01); *F16H 2200/0034* (2013.01)

(58) Field of Classification Search
CPC .... B60K 2023/0883; B60K 1/02; B60K 1/00; B60K 2001/001; B60K 23/08; F16H 2048/385; F16H 48/40

USPC ......................................................... 475/203
See application file for complete search history.

(56) References Cited

U.S. PATENT DOCUMENTS

| | | | | |
|---|---|---|---|---|
| 648,286 | A * | 4/1900 | Overman et al. ........ | B60K 3/00 174/1 |
| 739,687 | A * | 9/1903 | Küpper et al. .......... | F16H 48/12 475/203 |
| 1,093,277 | A * | 4/1914 | Leggett .................... | B60K 1/00 180/905 |
| 1,407,226 | A * | 2/1922 | Schubert ................ | B60K 17/16 475/203 |
| 1,459,894 | A * | 6/1923 | Irwin ...................... | F16H 3/145 475/160 |
| 1,783,780 | A * | 12/1930 | Evans ................... | B60K 17/046 475/237 |

(Continued)

FOREIGN PATENT DOCUMENTS

| | | | | |
|---|---|---|---|---|
| DE | 102020203669 A1 * | 9/2021 | .......... | B60L 15/2045 |
| DE | 102021125188 A1 * | 3/2023 | ............. | B60K 23/08 |
| WO | WO-2019038001 A1 * | 2/2019 | ............... | B60K 1/02 |

*Primary Examiner* — Sherry L Estremsky
(74) *Attorney, Agent, or Firm* — Withrow & Terranova, PLLC

(57) ABSTRACT

An electric drive axle includes an electric motor having an output shaft, a first gear mounted on the output shaft, a second gear in meshing engagement with the first gear, a differential case coaxial with the second gear, the differential case including first and second spider gears mounted on an axle perpendicular to an axis of the second gear, and first and second side gears in meshing engagement with the first and second spider gears, and a clutch for engaging and disengaging the second gear and the differential case.

12 Claims, 4 Drawing Sheets

(56) References Cited

U.S. PATENT DOCUMENTS

| | | | |
|---|---|---|---|
| 2,686,437 A * | 8/1954 | Murray | F16H 37/08 |
| | | | 74/374 |
| 2,717,521 A * | 9/1955 | Andershock | F16H 3/60 |
| | | | 74/411 |
| 5,385,513 A * | 1/1995 | Ishii | F16H 48/08 |
| | | | 475/198 |
| 7,094,172 B2 * | 8/2006 | Ishikawa | B60K 17/356 |
| | | | 475/160 |
| 9,457,658 B2 * | 10/2016 | Knoblauch | B60K 17/356 |
| 10,144,284 B2 * | 12/2018 | Christensen | B60K 23/08 |
| 10,995,836 B2 * | 5/2021 | Cooper | B60K 17/02 |
| 11,186,168 B1 * | 11/2021 | Kim | F16H 37/0813 |
| 11,186,172 B1 * | 11/2021 | Kumar | B60K 23/0808 |
| 11,305,748 B2 * | 4/2022 | Alcantar | B60K 17/354 |
| 11,318,837 B2 * | 5/2022 | Bortoli | B60W 10/02 |
| 12,025,213 B2 * | 7/2024 | Liu | F16H 48/40 |
| 12,030,377 B2 | 7/2024 | Barillot | |
| 12,066,087 B2 * | 8/2024 | Lee | F16H 48/24 |
| 2020/0055391 A1 | 2/2020 | Kumar et al. | |
| 2020/0263770 A1 | 8/2020 | Klurfeld et al. | |
| 2023/0011463 A1 | 1/2023 | Brolles et al. | |
| 2023/0050096 A1 | 2/2023 | Terrat et al. | |
| 2025/0010706 A1 * | 1/2025 | Barrientos | B60K 17/16 |

* cited by examiner

ELECTRICAL DRIVE AXLE AND VEHICLE COMPRISING AN ELECTRIC DRIVE AXLE

TECHNICAL FIELD

The disclosure relates generally to electric vehicles. In particular aspects, the disclosure relates to electric drive axles. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Electric vehicles often include electric drive axles. It can be difficult to mount components of electric drive axles on vehicle frames, particularly if the electric drive axle components involve a substantial number of components or if components, such as an electric motor of sufficient size to meet the vehicle's power requirements, are large.

SUMMARY

According to a first aspect of the disclosure, an electric drive axle comprising an electric motor having an output shaft, a first gear mounted on the output shaft, a second gear in meshing engagement with the first gear, a differential case coaxial with the second gear, the differential case comprising first and second spider gears mounted on an axle perpendicular to an axis of the second gear, and first and second side gears in meshing engagement with the first and second spider gears, and a clutch for engaging and disengaging the second gear and the differential case.

Technical benefits may include facilitating use of a minimal amount of equipment, and/or in a minimal amount of space, and/or over a minimal length in the longitudinal direction of the vehicle.

A technical benefit may include that the component arrangement can facilitate ensuring the electric drive axle is both mountable to a supporting frame and functionally suitable for particular applications.

Optionally in some examples, including in at least one preferred example, the electric drive axle further comprises a third gear mounted on the output shaft, a fourth gear in meshing engagement with the third gear, the differential case being coaxial with the fourth gear, and a second clutch for engaging and disengaging the fourth gear and the differential case.

A technical benefit may include facilitating use of the electric drive axle in a variety of different applications having different power requirements.

Optionally in some examples, including in at least one preferred example, the first gear and the second gear have a different reduction ratio than the third gear and the fourth gear.

A technical benefit may include facilitating use of the electric drive axle in a variety of different applications having different power requirements.

Optionally in some examples, including in at least one preferred example, the electric drive axle further comprises a twin electric motor having a twin electric motor output shaft, a twin electric motor first gear mounted on the twin electric motor output shaft, the second gear being in meshing engagement with the twin electric motor first gear.

A technical benefit may include facilitating meeting different power/torque demands of the vehicle, as well as facilitating positioning components of the electric drive axle on a vehicle.

Optionally in some examples, including in at least one preferred example, the first gear and the second gear have the same reduction ratio as the twin electric motor first gear and the second gear.

A technical benefit may include facilitating meeting different power/torque demands of the vehicle.

Optionally in some examples, including in at least one preferred example, the electric motor has a third gear mounted on the output shaft, the electric drive axle comprising a fourth gear in meshing engagement with the third gear, the differential case being coaxial with the second gear, and a second clutch for engaging and disengaging the fourth gear and the differential case.

A technical benefit may include facilitating use of the electric drive axle in a variety of different applications having different power requirements.

Optionally in some examples, including in at least one preferred example, the twin electric motor has a twin electric motor third gear mounted on the twin electric motor output shaft, the fourth gear being in meshing engagement with the twin electric motor third gear.

A technical benefit may include facilitating meeting different power/torque demands of the vehicle.

Optionally in some examples, including in at least one preferred example, the electric drive axle comprises first and second axle shafts, wherein the first and second axle shafts are parallel with the output shaft.

A technical benefit may include facilitating use of a minimal amount of equipment, in a minimal amount of space, and over a minimal length in the longitudinal direction D of the vehicle.

Optionally in some examples, including in at least one preferred example, the electric drive axle comprises first and second axle shaft disconnects associated with the first and second axle shafts, respectively, for connecting the first and second axle shafts to and disconnecting the first and second axle shaft from shafts of the first and second side gears, respectively.

A technical benefit may include permitting, in vehicles comprising plural electric drive axles, wheels of one or more of the electric drive axles to be disconnected where fewer than all of the electric drive axles need to be used, thereby reducing drag losses due by minimizing the number of spinning components in the disconnected axles. Additionally, the disconnects can function as towing disconnects, allowing the geartrain to be disconnected from the wheels.

Optionally in some examples, including in at least one preferred example, a vehicle comprises the electric drive axle of the first aspect of the disclosure.

A technical benefit may include provision, in a vehicle, of an electric drive axle involving a minimal amount of equipment, in a minimal amount of space, and/or over a minimal length in the longitudinal direction of the vehicle.

According to a second aspect of the disclosure, an electric drive axle comprises an electric motor having an output shaft, a first gear mounted on the output shaft, a second gear in meshing engagement with the first gear, a differential case coaxial and engageable with the second gear, the differential case comprising first and second spider gears mounted on an axle perpendicular to an axis of the second gear, and first and second side gears in meshing engagement with the first and second spider gears, and first and second axle shafts connectable to shafts of the first and second spider gears, respectively, wherein the first and second axle shafts are parallel with the output shaft.

Technical benefits may include facilitating use of a minimal amount of equipment, and/or in a minimal amount of space, and/or over a minimal length in the longitudinal direction of the vehicle.

Optionally in some examples, including in at least one preferred example, the electric drive axle comprises first and second axle shaft disconnects associated with the first and second axle shafts, respectively, for connecting the first and second axle shafts to and disconnecting the first and second axle shaft from the first and second side gears, respectively.

A technical benefit may include permitting, in vehicles comprising plural electric drive axles, wheels of one or more of the electric drive axles to be disconnected where fewer than all of the electric drive axles need to be used, thereby reducing drag losses due by minimizing the number of spinning components in the disconnected axles. Additionally, the disconnects can function as towing disconnects, allowing the geartrain to be disconnected from the wheels.

Optionally in some examples, including in at least one preferred example, the electric drive axle comprises a third gear mounted on the output shaft, a fourth gear in meshing engagement with the third gear, the differential case being coaxial and engageable with and the fourth gear.

A technical benefit may include facilitating use of the electric drive axle in a variety of different applications having different power requirements.

Optionally in some examples, including in at least one preferred example, the electric drive axle comprises a clutch arrangement for engaging a selected one of the second gear and the fourth gear with the differential case.

A technical benefit may include facilitating use of the electric drive axle in a variety of different applications having different power requirements.

Optionally in some examples, including in at least one preferred example, the electric drive axle comprises a twin electric motor having a twin electric motor output shaft, and a twin electric motor first gear mounted on the twin electric motor output shaft, the second gear being in meshing engagement with the twin electric motor first gear.

A technical benefit may include facilitating meeting different power/torque demands of the vehicle, as well as facilitating positioning components of the electric drive axle on a vehicle.

Optionally in some examples, including in at least one preferred example, the electric motor has a third gear mounted on the output shaft, and the electric drive axle comprises a fourth gear in meshing engagement with the third gear, the differential case being coaxial and engageable with the fourth gear, and a clutch arrangement for engaging a selected one of the second gear and the fourth gear with the differential case.

A technical benefit may include facilitating use of the electric drive axle in a variety of different applications having different power requirements.

Optionally in some examples, including in at least one preferred example, the twin electric motor has a twin electric motor third gear mounted on the twin electric motor output shaft, the fourth gear being in meshing engagement with the twin electric motor third gear.

A technical benefit may include facilitating use of the electric drive axle in a variety of different applications having different power requirements.

Optionally in some examples, including in at least one preferred example, the first gear and the second gear have a different reduction ratio than the third gear and the fourth gear.

A technical benefit may include facilitating use of the electric drive axle in a variety of different applications having different power requirements.

Optionally in some examples, including in at least one preferred example, the first gear and the second gear have the same reduction ratio as the twin electric motor first gear and the twin electric motor second gear.

A technical benefit may include facilitating meeting different power/torque demands of the vehicle.

Optionally in some examples, including in at least one preferred example, a vehicle comprising the electric drive axle of the second aspect of the disclosure.

A technical benefit may include provision, in a vehicle, of an electric drive axle involving a minimal amount of equipment, in a minimal amount of space, and/or over a minimal length in the longitudinal direction of the vehicle.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
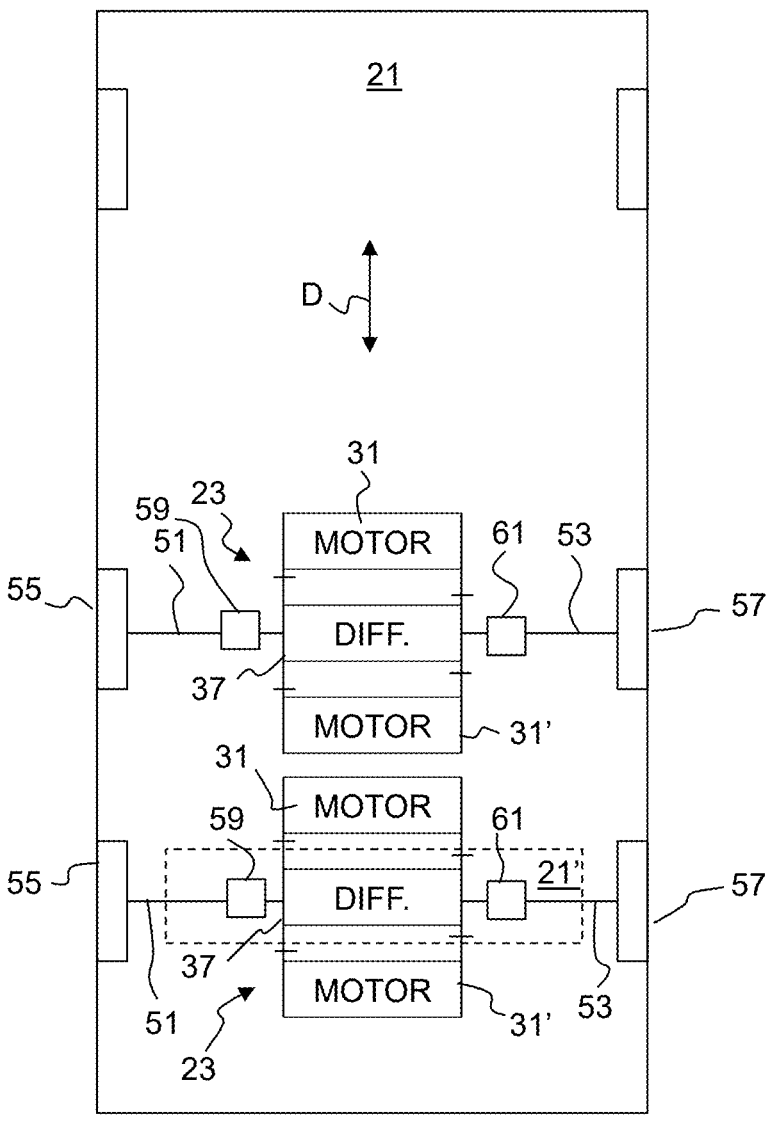
FIG. 1 is a schematic view of an exemplary vehicle including an electric drive axle according to an example.

A vehicle 21 comprising an electric drive axle 23 according to an aspect of the present invention is shown in FIG. 1. The electric drive axle 23 is shown schematically in FIG. 2 and comprises an electric motor 31 having a rotor 25 with an output shaft 29 and a stator 27, and a first gear reduction comprising a first gear 33 mounted on the output shaft and a second gear 35 in meshing engagement with the first gear. The electric drive axle 23 further comprises a differential case 37 coaxial with the second gear 35, the differential case comprising first and second spider gears 39 and 41, respectively, mounted on an axle 43 that is perpendicular to an axis A of the second gear, and first and second side gears 45 and 47, respectively, in meshing engagement with the first and second spider gears. The electric drive axle 23 further comprises a clutch 49 for engaging and disengaging the second gear 35 and the differential case 37. FIG. 1 shows a vehicle with two electric drive axles, each with two motors, however, it will be appreciated that a vehicle may have configurations including but not limited to a single electric drive axle with a single electric motor, a single electric drive axle with two electric motors, a pair of electric drive axles each with a single electric motor, a pair or of electric drive axles, one of which has a single electric motor and the other of which has two electric motors, or, as shown, a pair of electric drive axles each with two electric motors.

The electric drive axle 23 facilitates transmission of power from the output shaft 29 of the electric motor 31 to the spider gears 39 and 41, and thence, to first and second axle shafts 51 and 53, respectively, and first and second wheels 55 and 57, respectively, of the vehicle 21, usually via first and second final gear reductions 59 and 61, respectively, and first and second axle disconnects 63 and 65, respectively, if provided. It is not necessary to provide additional gearing between the output shaft 29 and driving and driven gears of the first and second gear reductions. The first and second axle shafts 51 and 53, respectively, are linked to the spider gears 39 and 41, respectively, such as by the first and second final gear reductions 59 and 61, respectively, and first and second axle disconnects 63 and 65, respectively, so that the first and second axle shafts are parallel with the output shaft 29. Such a configuration can facilitate using a minimal amount of equipment, and/or in a minimal amount of space, and/or over a minimal length in the longitudinal direction D (FIG. 1) of the vehicle.

Selection of the first and second final gear reductions 59 and 61 facilitates use of the electric drive axle in a variety of different applications, such as applications having different power requirements. For example, the same size ring gear can be used while selecting different sun and planet gear sizes for the first and second final gear reductions 59 and 61.

The electric drive axle 23 can include a second gear reduction including a third gear 67 mounted on the output shaft 29 and a fourth gear 69 in meshing engagement with the third gear, the differential case 37 being coaxial with the fourth gear, and a second clutch 71 for engaging and disengaging the fourth gear and the differential case. The first gear reduction comprising the first gear 33 and the second gear 35 will ordinarily have a different reduction ratio than the second gear reduction comprising the third gear 67 and the fourth gear 69. The provision of first and second gear reductions facilitates meeting different power/torque demands of the vehicle 21. The first and second gear reductions will ordinarily comprise only two gears each, with teeth of one of the two gears meshing directly with teeth of the other one of the two gears.

Figure 2:
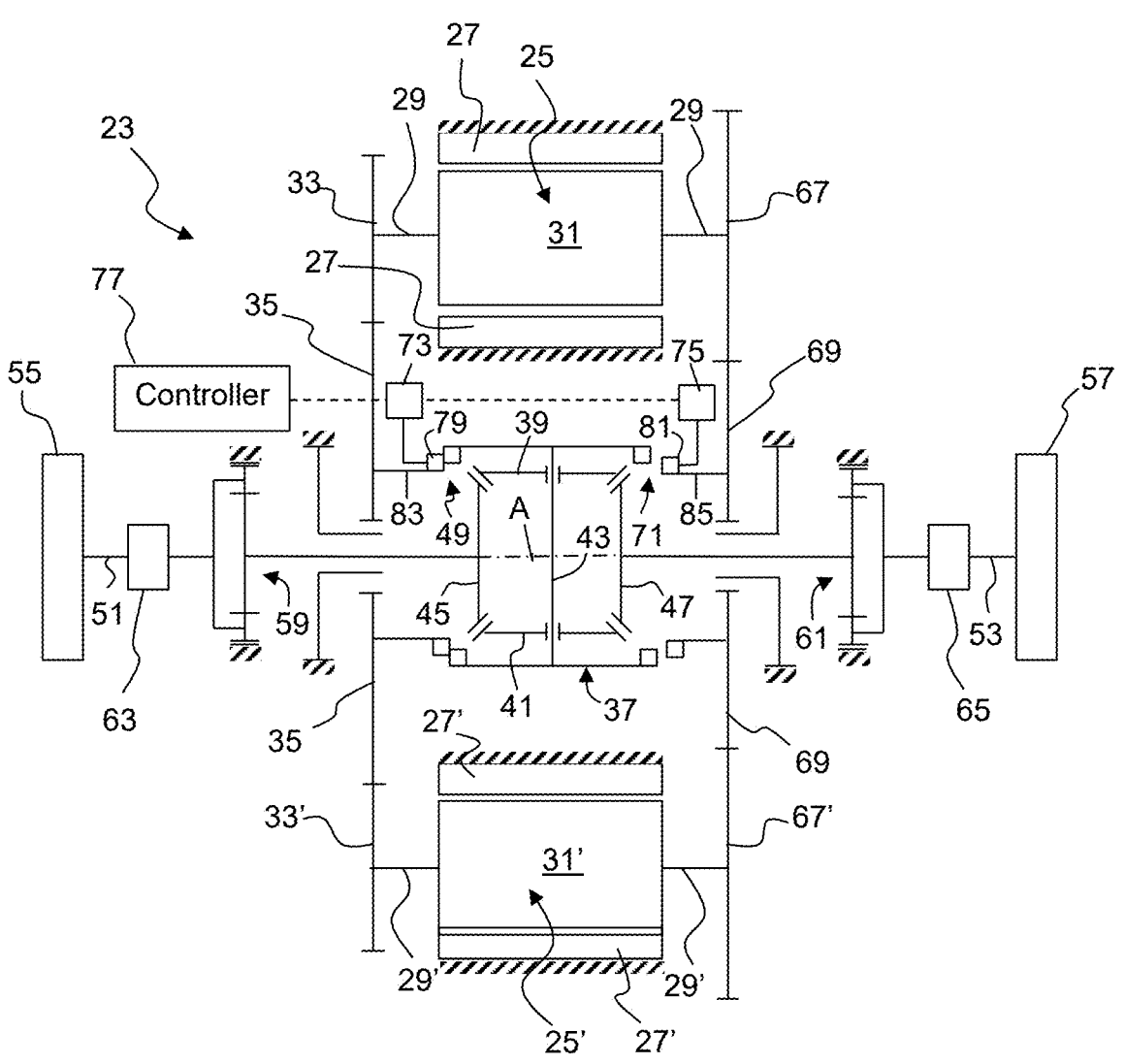
FIG. 2 is a schematic view of an exemplary electric drive axle according to an example.

As seen in FIG. 2, the clutch 49 and the second clutch 71 will ordinarily be part of a suitable clutch arrangement configured to permit engagement of only a selected one of the second gear 35 and the fourth gear 69 with the differential case 37 at a time, such as first and second pneumatic actuators 73 and 75, respectively, controlled by a controller 77 and arranged to selectively advance or retract first and second coupling sleeves 79 and 81, respectively, splined on gear shafts 83 and 85, respectively, of the second gear and the fourth gear, respectively.

As seen in FIGS. 1 and 2, the electric drive axle 23 can comprise a twin electric motor 31' having a twin electric motor rotor 25' with a twin electric motor output shaft 29' and a twin electric motor stator 27', and a twin electric motor first gear reduction comprising a twin electric motor first gear 33' mounted on the twin electric motor output shaft and the second gear 35 in meshing engagement with the twin electric motor first gear. The first gear 33 and the second gear 35 have the same reduction ratio as the twin electric motor first gear 33' and the second gear 35. As with the electric motor 31, the twin electric motor 31' can have a twin electric motor second gear reduction including a twin electric motor third gear 67' mounted on the twin electric motor output shaft 29' and the fourth gear 69 in meshing engagement with the twin electric motor third gear. This arrangement further facilitates meeting different power/torque demands of the

Figure 4:
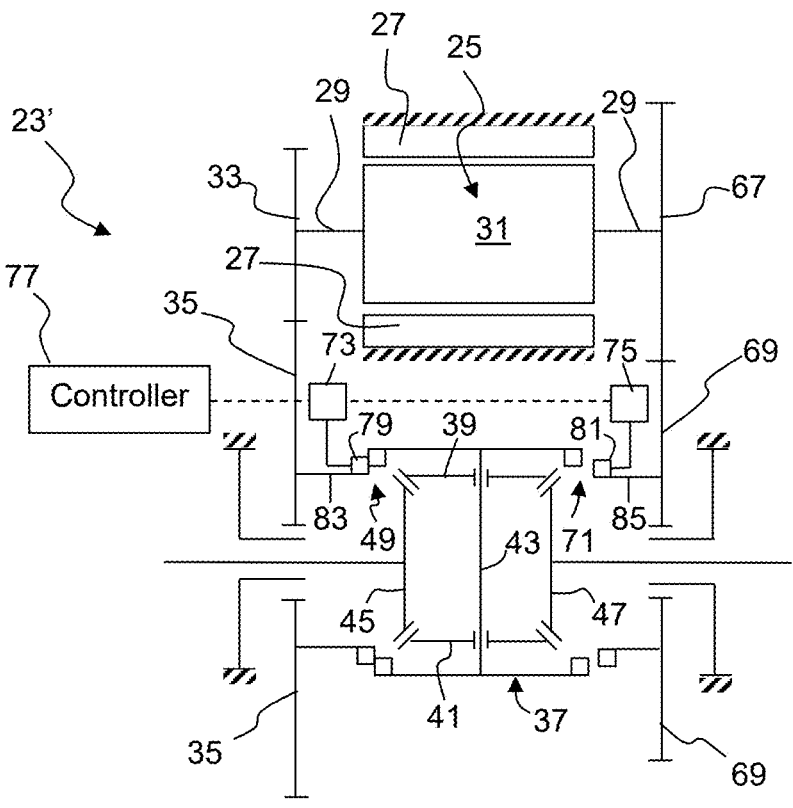
FIG. 4 is a schematic view of an exemplary electric drive axle according to an example.

6 vehicle 21, as well as facilitating positioning components of the electric drive axle on a vehicle, such as by positioning the electric motor 31 and the twin electric motor 31' on opposite sides a portion of the vehicle frame, such as a beam 21' (FIG. 1). For example, the electric motors 31 and 31' may be vertically above a bottom of the portion of the vehicle frame 21', while the top of the differential case 37 may be vertically lower than the electric motors and beneath the bottom of the portion of the vehicle frame. As seen in FIG. 1, one or more electric drive axles can be provided on the vehicle 21. As seen in FIG. 4, it will be appreciated that an electric drive axle 23' can include a single electric motor 31 instead of an electric motor and a twin electric motor 31'.

Providing an electric drive axle 23 including an electric motor 31 and a twin electric motor 31', in addition to facilitating meeting different power/torque demands of the vehicle 21, facilitates mounting the electric motor and the twin electric motor in a balanced manner on opposite sides of the first and second axle shafts 51 and 53. Output shafts 29 and 29' of the electric motor 25 and the twin electric motor 25' can be parallel with the first and second axle shafts 51 and 53, facilitating positioning of the electric drive axle 23 on the frame of the vehicle 21.

The electric drive axle 23 may further comprise first and second axle shaft disconnects 63 and 65, respectively, associated with the first and second axle shafts 51 and 53, respectively, for connecting the first and second axle shafts to and disconnecting the first and second axle shaft from shafts of the first and second side gears 45 and 47, respectively. In vehicles comprising plural electric drive axles, wheels of one or more of the electric drive axles can be disconnected where fewer than all of the electric drive axles need to be used, thereby reducing drag losses due by minimizing the number of spinning components in the disconnected axles. Additionally, the disconnects 63 and 65 can function as towing disconnects, allowing the geartrain to be disconnected from the wheels.

Figure 3:
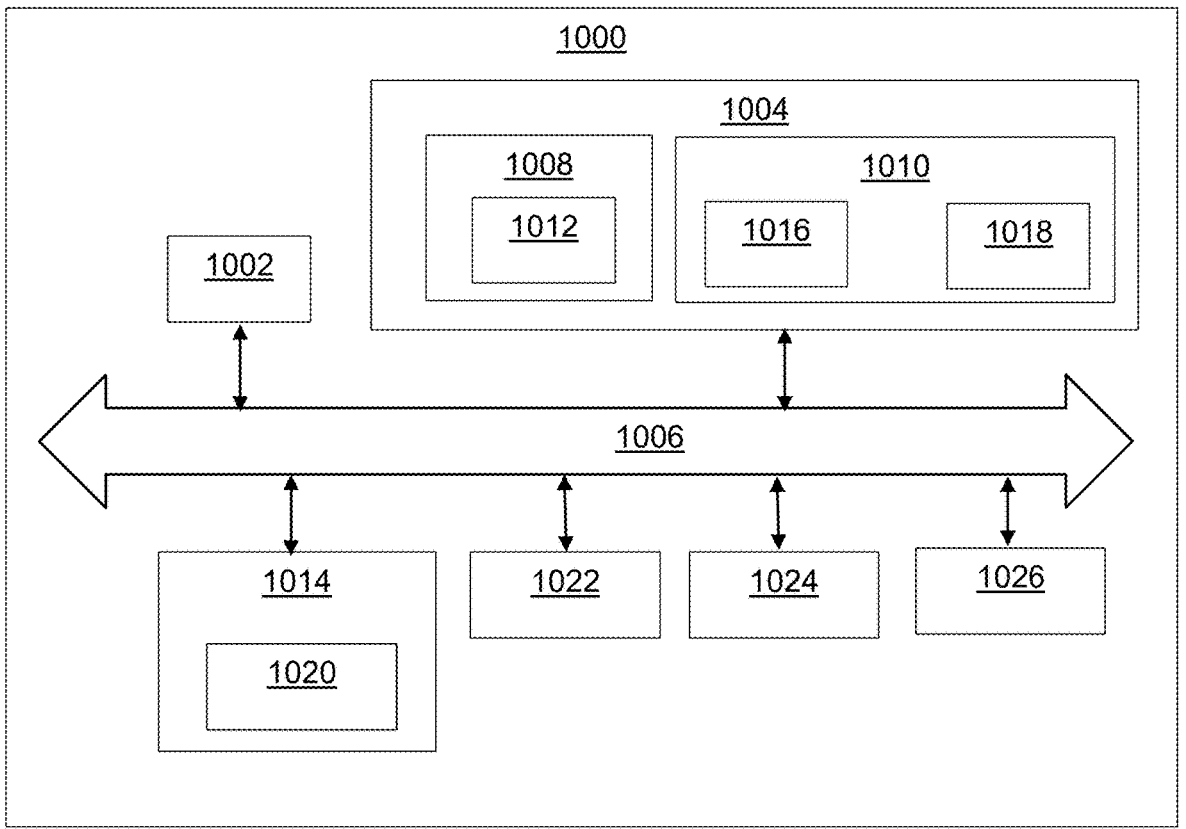
FIG. 3 is a schematic diagram of an exemplary computer system for implementing examples disclosed herein, according to an example.

The controller is ordinarily a form of computer system. FIG. 3 is a schematic diagram of an illustrative computer system 1000 of a type suitable for implementing examples disclosed herein. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, the control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or signal processing or for executing computer code stored in memory 1004. The processing circuitry 1002 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s)

can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1. An electric drive axle comprises an electric motor having an output shaft, a first gear mounted on the output shaft, a second gear in meshing engagement with the first gear, a differential case coaxial with the second gear, the differential case comprising first and second spider gears mounted on an axle perpendicular to an axis of the second gear, and first and second side gears in meshing engagement with the first and second spider gears, and a clutch for engaging and disengaging the second gear and the differential case.

Example 2. The electric drive axle as set forth in example 1, further comprising a third gear mounted on the output shaft, a fourth gear in meshing engagement with the third gear, the differential case being coaxial with the fourth gear, and a second clutch for engaging and disengaging the fourth gear and the differential case.

Example 3. The electric drive axle as set forth in example 2, wherein the first gear and the second gear have a different reduction ratio than the third gear and the fourth gear.

Example 4. The electric drive axle as set forth in example 1, further comprising a twin electric motor having a twin electric motor output shaft, a twin electric motor first gear mounted on the twin electric motor output shaft, the second gear being in meshing engagement with the twin electric motor first gear.

Example 5. The electric drive axle as set forth in example 4, wherein the first gear and the second gear have the same reduction ratio as the twin electric motor first gear and the second gear.

Example 6. The electric drive axle as set forth in example 4, wherein the electric motor has a third gear mounted on the output shaft, the electric drive axle comprising a fourth gear in meshing engagement with the third gear, the differential case being coaxial with the second gear, and a second clutch for engaging and disengaging the fourth gear and the differential case.

Example 7. The electric drive axle as set forth in example 6, wherein the twin electric motor has a twin electric motor third gear mounted on the twin electric motor output shaft, the fourth gear being in meshing engagement with the twin electric motor third gear.

Example 8. The electric drive axle as set forth in example 1, comprising first and second axle shafts, wherein the first and second axle shafts are parallel with the output shaft.

Example 9. The electric drive axle as set forth in example 8, comprising first and second axle shaft disconnects associated with the first and second axle shafts, respectively, for connecting the first and second axle shafts to and disconnecting the first and second axle shaft from shafts of the first and second side gears, respectively.

Example 10. A vehicle comprising the electric drive axle of example 1.

Example 11. An electric drive axle comprises an electric motor having an output shaft, a first gear mounted on the output shaft, a second gear in meshing engagement with the first gear, a differential case coaxial and engageable with the second gear, the differential case comprising first and second spider gears mounted on an axle perpendicular to an axis of the second gear, and first and second side gears in meshing engagement with the first and second spider gears, and first and second axle shafts connectable to shafts of the first and second spider gears, respectively, wherein the first and second axle shafts are parallel with the output shaft.

Example 12. The electric drive axle as set forth in example 11, comprising first and second axle shaft disconnects associated with the first and second axle shafts, respectively, for connecting the first and second axle shafts to and disconnecting the first and second axle shaft from the first and second side gears, respectively.

Example 13. The electric drive axle as set forth in example 11, further comprising a third gear mounted on the output shaft, a fourth gear in meshing engagement with the third gear, the differential case being coaxial and engageable with and the fourth gear.

Example 14. The electric drive axle as set forth in example 13, comprising a clutch arrangement for engaging a selected one of the second gear and the fourth gear with the differential case.

Example 15. The electric drive axle as set forth in example 12, further comprising a twin electric motor having a twin electric motor output shaft, and a twin electric motor first gear mounted on the twin electric motor output shaft, the second gear being in meshing engagement with the twin electric motor first gear.

Example 16. The electric drive axle as set forth in example 15, wherein the electric motor has a third gear mounted on the output shaft, and the electric drive axle comprises a fourth gear in meshing engagement with the third gear, the differential case being coaxial and engageable with the fourth gear, and a clutch arrangement for engaging a selected one of the second gear and the fourth gear with the differential case.

Example 17. The electric drive axle as set forth in example 16, wherein the twin electric motor has a twin electric motor third gear mounted on the twin electric motor output shaft, the fourth gear being in meshing engagement with the twin electric motor third gear.

Example 18. The electric drive axle as set forth in example 16, wherein the first gear and the second gear have a different reduction ratio than the third gear and the fourth gear.

Example 19. The electric drive axle as set forth in example 18, wherein the first gear and the second gear have the same reduction ratio as the twin electric motor first gear and the second gear.

Example 20. A vehicle comprising the electric drive axle of example 11.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An electric drive axle, comprising:
an electric motor having an output shaft;
a first gear mounted on the output shaft;
a second gear in meshing engagement with the first gear;
a third gear mounted on the output shaft;
a fourth gear in meshing engagement with the third gear;
a differential case coaxial with the second gear, the differential case comprising first and second spider gears mounted on an axle perpendicular to an axis of the second gear, and first and second side gears in meshing engagement with the first and second spider gears;
a first clutch for engaging and disengaging the second gear and the differential case;
a second clutch for engaging and disengaging the fourth gear and the differential case; and
a twin electric motor having a twin electric motor output shaft; a twin electric motor first gear mounted on the twin electric motor output shaft, the second gear being in meshing engagement with the twin electric motor first gear; and a twin electric motor third gear mounted on the twin electric motor output shaft, the fourth gear being in meshing engagement with the twin electric motor third gear.

2. The electric drive axle as set forth in claim 1, wherein the differential case is coaxial with the fourth gear, and a second clutch for engaging and disengaging the fourth gear and the differential case.

3. The electric drive axle as set forth in claim 2, wherein the first gear and the second gear have a different reduction ratio than the third gear and the fourth gear.

4. The electric drive axle as set forth in claim 1, wherein the first gear and the second gear have the same reduction ratio as the twin electric motor first gear and the second gear.

5. The electric drive axle as set forth in claim 1, comprising first and second axle shafts, wherein the first and second axle shafts are parallel with the output shaft.

6. The electric drive axle as set forth in claim 5, comprising first and second axle shaft disconnects associated with the first and second axle shafts, respectively, for connecting the first and second axle shafts to and disconnecting the first and second axle shaft from shafts of the first and second side gears, respectively.

7. A vehicle comprising the electric drive axle of claim 1.

8. An electric drive axle, comprising:
an electric motor having an output shaft;
a first gear mounted on the output shaft;
a second gear in meshing engagement with the first gear;
a third gear mounted on the output shaft;
a fourth gear in meshing engagement with the third gear;
a differential case coaxial and engageable with the second gear, the differential case being coaxial and engageable with the fourth gear, the differential case comprising:
first and second spider gears mounted on a spider gear shaft perpendicular to an axis of the second gear, and first and second side gears in meshing engagement with the first and second spider gears;
first and second axle shafts connectable to the spider gear shafts of the first and second spider gears, respectively, wherein the first and second axle shafts are parallel with the output shaft;
first and second axle shaft disconnects associated with the first and second axle shafts, respectively, for connecting the first and second axle shafts to and disconnecting the first and second axle shaft from the first and second side gears, respectively;
a clutch arrangement for engaging a selected one of the second gear and the fourth gear with the differential case; and
a twin electric motor having a twin electric motor output shaft;
a twin electric motor first gear mounted on the twin electric motor output shaft, the second gear being in meshing engagement with the twin electric motor first gear; and
a twin electric motor third gear mounted on the twin electric motor output shaft, the fourth gear being in meshing engagement with the twin electric motor third gear.

9. The electric drive axle as set forth in claim 8, wherein the differential case is coaxial and engageable with and the fourth gear.

10. The electric drive axle as set forth in claim 8, wherein the first gear and the second gear have a different reduction ratio than the third gear and the fourth gear.

11. The electric drive axle as set forth in claim 10, wherein the first gear and the second gear have the same reduction ratio as the twin electric motor first gear and the second gear.

12. A vehicle comprising the electric drive axle of claim 8.

* * * * *